June 24, 1958  H. P. SMITH ET AL  2,840,018
PLANTER VALVE MECHANISM
Filed July 18, 1956  2 Sheets-Sheet 1
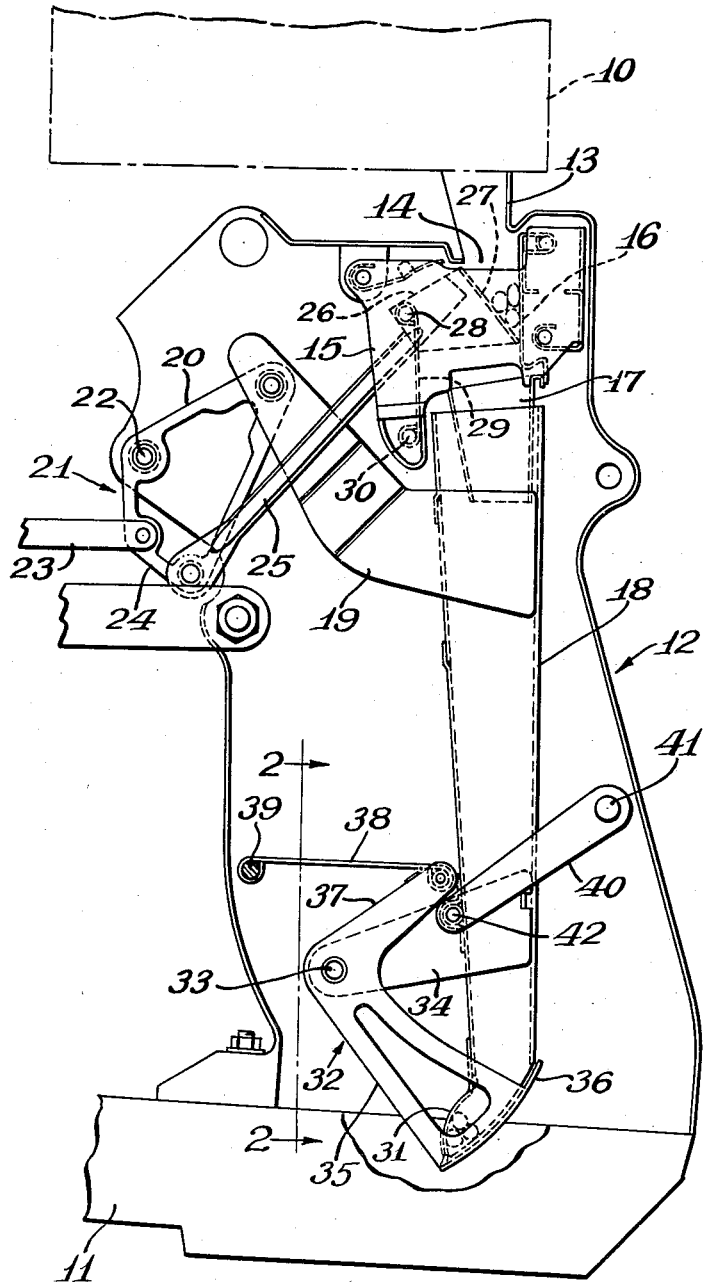
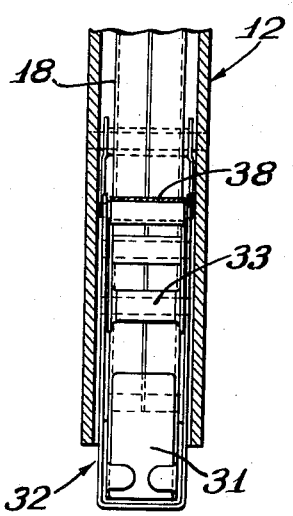
Inventors:
Hiram P. Smith
Clarence C. Haas
Paul O. Pippel
Atty.

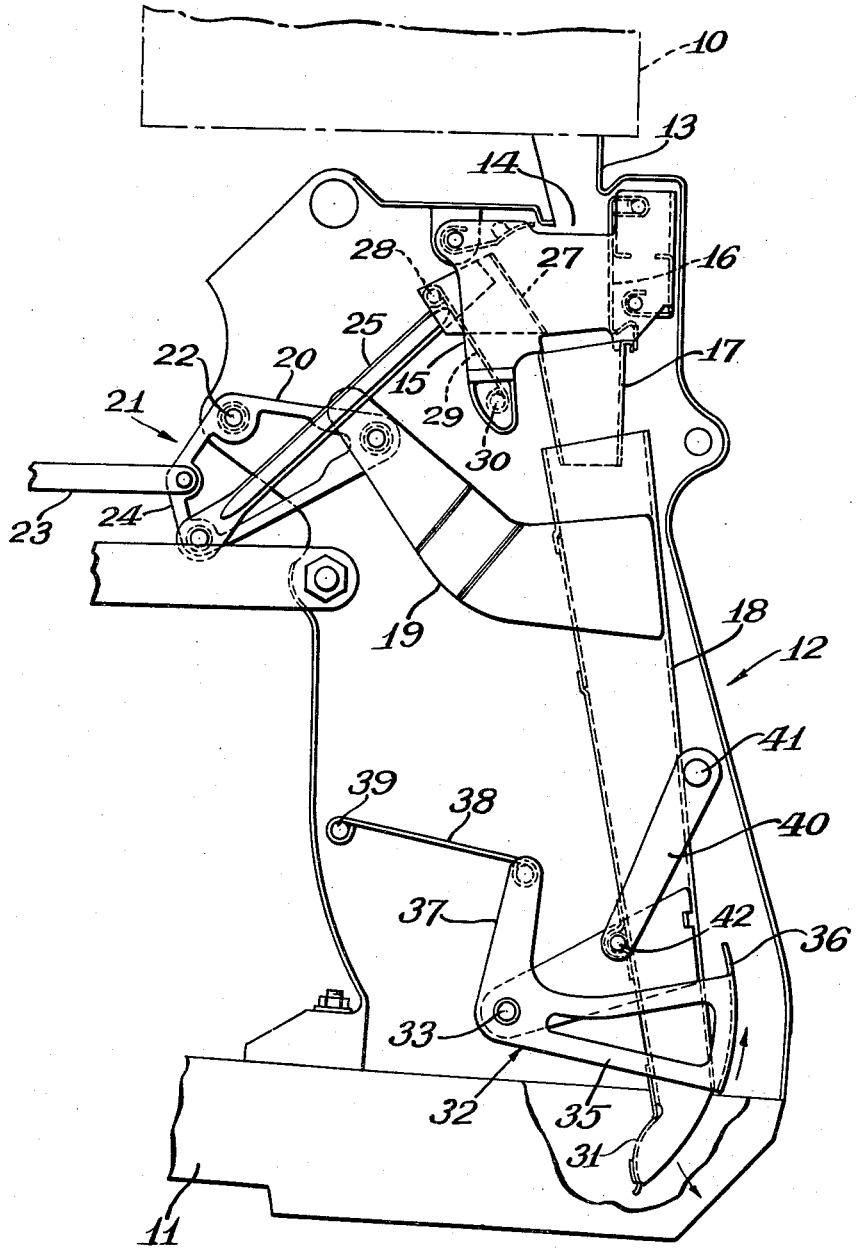

United States Patent Office 2,840,018
Patented June 24, 1958

2,840,018
PLANTER VALVE MECHANISM

Hiram P. Smith, Chicago, Ill., and Clarence C. Haas, Richmond, Ind., assignors to International Harvester Company, a corporation of New Jersey Application July 18, 1956, Serial No. 598,716

3 Claims. (Cl. 111—51)

This invention relates to planters and particularly to improved feeding mechanism for depositing seed and the like in the ground. The invention is particularly applicable to corn planters of the drill type wherein a plurality of seed kernels are deposited in hills at regular intervals as the planter travels over the ground.

In corn planters, seed in a hopper is picked up by a revolving plate having cells therein to receive the individual seeds and the latter are discharged from the cells in the plate as they pass over an outlet in the bottom of the hopper. A planter boot between the hopper and the earth penetrating tool that opens a furrow in the ground includes seed guides and gate or valve means for controlling the passage of seed through the boot to assure collection and discharge of a desired number of seed in the hill. An object of the present invention is to provide improved boot and valving apparatus for a planter adapted to deposit at selected intervals a plurality of seeds in a compact grouping in the furrow formed by the earth penetrating tool.

Another object of the invention is to provide a planter valve apparatus wherein the tube through which seed is passed is moved up and down in the planter boot and this action utilized to actuate the valve which closes the lower end of the tube, the valve being so arranged that it moves upwardly rapidly away from the discharge outlet of the tube while the tube moves downwardly to facilitate ejection of the seed into the ground.

Other objects and advantages of the invention will become clear from the following detailed description when read in conjunction with the accompanying drawings, wherein:

Figure 1 is a view in side elevation of a seed boot and valve or gate mechanism incorporating the features of this invention, with one side of the boot removed to show the operating mechanism therein, the gates at the upper and lower ends of the seed tube being closed;

Figure 2 is a section taken on the line 2—2 of Figure 1; and

Figure 3 is a view similar to Figure 1 showing the valves or gates in their open position.

In the drawings the seed hopper of a corn planter is designated by the numeral 10, and an earth penetrating furrow opener 11 is separated therefrom by the planter boot 12. The boot 12 is generally rectangular in section and provides a passageway between the hopper 10 and the furrow opener 11 through which seed falls to the ground. The hopper 10 is indicated schematically, and it may be understood that the dispensing mechanism therein is conventional, and the seed from the hopper 10 falls through a chute 13 into a walled space 14 flanked by brackets 15, only one of which is shown, and having a rear wall 16.

A short tube 17 affixed to brackets 15 and depending therefrom receives seed falling through the passageway 14 and directs it into a vertically elongated seed tube 18, the upper end of which telescopically receives the lower portion of member 17, and which tapers downwardly toward its lower end. Another bracket 19 comprising laterally spaced members, only one of which is shown, is affixed to the upper end of tube 18 and extends forwardly and upwardly therefrom for the pivotal connection thereto of one arm 20 of a rockable member 21 fulcrumed at 22 in the housing of the boot 12. Rockable member 21 is somewhat in the form of a bell crank in the upper end of the boot housing and is rocked by the conventional means utilized in planters of this type, motion being transmitted through a rod 23 to rock the member 21 about its axis 22. By virtue of its connection to the bracket 19 on the upper end of tube 18, rocking of the member 21 swings the tube 18 vertically from the position of Figure 1 to the position of Figure 3.

Another arm 24 of the rockable member or bell crank 21 is pivotally connected to one end of a link 25, the other end of which has secured thereto a valve member 26 having a slanted gate portion 27. In the position of the parts shown in Figure 1, rocking of member 21 has moved the valve member 26 across the passageway 14 until the lower edge of gate 27 engages rear wall 16, forming a wedge-shaped pocket for the accumulation of seed falling through the chute 13 from the hopper 10, the seed being indicated in dotted lines. The valve member 26 is supported to travel in a fixed path between closed and open positions, as shown in Figures 1 and 3, by the provision of a transverse pin 28, to which is connected the upper end of a leaf spring 29, the lower end of which is anchored to a pin 30 carried by the bracket 15. When the upper valve 26 moves to the position shown in Figure 3, the seed caught by gate 27 falls through the tubes 17 and 18.

The lower end of tube 18 is provided at its forward edge with an arcuately shaped toe portion 31, and the opening at the lower end of the tube is closed by a bell crank 32 formed of laterally spaced parts, only one of which is shown, fulcrumed upon a pivot pin 33 carried at the forward end of bracket means 34 affixed to and projecting forwardly from the lower portion of tube 18. An arm 35 of the bell crank forms a gate having a transverse closure portion 36 covering the open lower end of tube 18, and forming with the arcuately shaped toe portion 31 a pocket for the reception of seed after it is released by the upper valve 26. Another arm 37 of bell crank 32 is pivotally connected to one end of a link 38, which extends horizontally forwardly, and is anchored at 39 to the walls of boot 12. It should thus be seen that when the supporting means for the upper end of seed tube 18, which is the upper bell crank 21 pivotally connected to the member 19 is rocked, the tube 18 moves up and down in the boot 12, and since link 38 is anchored to the housing of the boot, movement of the seed tube rocks the bell crank 32 and moves gate closure 36 toward and away from the opening in the bottom of the seed tube. Additional supporting means is provided for the lower end of tube 18 by link means 40 pivoted at 41 in the walls of the boot 12 and preferably comprising a pair of laterally spaced links straddling the seed tube and carrying a transverse pin 42 at their forward ends.

The seed dispensing apparatus of this invention operates efficiently and deposits the seed caught in the pocket formed by the toe 31 of the seed tube 18 and gate 36, in a compact group in the furrow formed by the earth working tool 11. This is facilitated by the ejecting action of the tube 18 as it moves downwardly from the position of Figure 1 to that of Figure 3, and the quick opening of the lower end of the tube by the rapid movement vertically upwardly of the closure member 36 away from the discharge outlet.

The operation of the seed dispensing apparatus of this invention should be clearly understood from the foregoing description. It should likewise be understood that the invention has been described in its preferred embodiment only, and that modifications may be made in the invention without departing from the spirit thereof or the scope of the appended claims.

What is claimed is:

1. In a planter including a housing and a seed guide in the housing open at the top and bottom for the passage of seed therethrough, means mounting the guide in the housing for generally vertical movement therein, comprising a link pivotally connected at one end to the housing and at its other end to the guide to accommodate swinging of the guide with the link about the pivot of the latter in the housing, a bell crank independent of said link fulcrumed on the guide near its lower end, a gate forming one arm of said bell crank and covering the opening at the bottom of the guide to catch seed passing therethrough, another link pivotally connected at one end to the housing and at its other end to the other arm of the bell crank, and means mounted in said housing operatively connected to said guide for vertically moving the latter, said bell crank being rockable in response to movement of said guide to move the gate to and from a position over the opening at the bottom of said guide to periodically discharge seed therefrom.

2. In a planter including a housing and a seed guide in the housing open at the top and bottom for the passage of seed therethrough, means mounting the guide in the housing for generally vertical movement therein, comprising a link pivotally connected at one end to the housing and at its other end to the guide to accommodate swinging of the guide with the link about the pivot of the latter in the housing, a bell crank independent of said link fulcrumed on the guide near its lower end, a gate forming one arm of said bell crank and covering the opening at the bottom of the guide to catch seed passing therethrough, another link pivotally connected at one end to the housing and at its other end to the other arm of the bell crank, said bell crank being rockable in response to movement of said guide to move the gate to and from a position over the opening at the bottom of said guide to periodically discharge seed therefrom, another bell crank fulcrumed in the upper end of the housing, means operatively connecting one arm of said other bell crank to said guide for moving the latter in response to rocking of said other bell crank, and means operatively connected to said other bell crank for rocking the latter.

3. In a planter including a housing and a seed guide in the housing open at the top and bottom for the passage of seed therethrough, means mounting the guide in the housing for generally vertical movement therein, comprising a link pivotally connected at one end to the housing and at its other end to the guide to accommodate swinging of the guide with the link about the pivot of the latter in the housing, a bell crank independent of said link fulcrumed on the guide near its lower end, a gate forming one arm of said bell crank and covering the opening at the bottom of the guide to catch seed passing therethrough, another link pivotally connected at one end to the housing and at its other end to the other arm of the bell crank, said bell crank being rockable in response to movement of said guide to move the gate to and from a position over the opening at the bottom of said guide to periodically discharge seed therefrom, another bell crank fulcrumed in the upper end of the housing, means operatively connecting one arm of said other bell crank to said guide for moving the latter in response to rocking of said other bell crank, means operatively connected to said other bell crank for rocking the latter, and a gate connected to the other arm of the other of said bell cranks, said last-mentioned gate being movable by the rocking of the associated bell crank to and from a position closing the top of said guide.

References Cited in the file of this patent

UNITED STATES PATENTS

| 2,340,163 | White | Jan. 25, 1944 |
| 2,648,301 | White et al. | Aug. 11, 1953 |